US007834778B2

(12) United States Patent
Browne et al.

(10) Patent No.: US 7,834,778 B2
(45) Date of Patent: Nov. 16, 2010

(54) PARKING SPACE LOCATOR

(75) Inventors: Alan L. Browne, Gross Pointe, MI (US); Osman D. Altan, Northville, MI (US); Douglas P. Rheaume, Chesterfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1489 days.

(21) Appl. No.: 11/207,514

(22) Filed: Aug. 19, 2005

(65) Prior Publication Data

US 2007/0040701 A1 Feb. 22, 2007

(51) Int. Cl.
*B60Q 1/48* (2006.01)
*G08G 1/123* (2006.01)

(52) U.S. Cl. ............................ 340/932.2; 340/995.12; 705/13; 701/208

(58) Field of Classification Search ............... 340/932.2
See application file for complete search history.

(56) References Cited

U.S. PATENT DOCUMENTS

| | | | | |
|---|---|---|---|---|
| 5,910,782 | A | 6/1999 | Schmitt et al. | 340/995 |
| 5,940,481 | A | 8/1999 | Zeitman | 379/114 |
| 6,501,391 | B1 | 12/2002 | Racunas, Jr. | 340/932.2 |
| 6,750,786 | B1 | 6/2004 | Racunas, Jr. | 340/932.2 |
| 6,927,700 | B1 * | 8/2005 | Quinn | 340/932.2 |
| 2002/0161520 | A1 * | 10/2002 | Dutta et al. | 701/213 |
| 2003/0107498 | A1 | 6/2003 | Drennan | 340/825.28 |
| 2003/0112154 | A1 * | 6/2003 | Yoakum et al. | 340/932.2 |
| 2004/0068433 | A1 | 4/2004 | Chatterjee et al. | 705/13 |
| 2004/0236615 | A1 | 11/2004 | Msndy | 705/5 |
| 2004/0254840 | A1 | 12/2004 | Slemmer et al. | 705/22 |
| 2005/0002544 | A1 | 1/2005 | Winter et al. | 382/104 |
| 2005/0033634 | A1 | 2/2005 | Pugliese, III | 705/13 |

* cited by examiner

*Primary Examiner*—Donnie L Crosland
(74) *Attorney, Agent, or Firm*—Cantor Colburn LLP

(57) ABSTRACT

A method for identifying available parking spaces. The method includes receiving data about a parking space from a vehicle, the data including a geographic indicator associated with the parking space. The data is stored in a database of available parking spaces. A geographic location is received from a parking space requestor. The database is searched for an available parking space within a proximity of the geographic location. If an available parking space within a proximity of the geographic location is located in the database, a geographic indicator associated with the available parking space is transmitted to the parking space requester.

27 Claims, 7 Drawing Sheets

PARKING SPACE LOCATOR

BACKGROUND OF THE INVENTION

The present disclosure relates generally to locating available parking spaces, and more particularly, to locating potentially available parking spaces within a geographic area and communicating the presence of the available parking spaces to a vehicle occupant.

The ever-increasing use of automobiles and limited space for parking, particularly in urban areas, has led to serious problems in parking management. It is often difficult to find reasonably priced parking spaces in a busy city. Street side parking spaces (i.e., metered and non-metered) typically represent a less expensive parking alternative than paying for garage parking, lot parking or valet parking. However, available street side parking spaces can be next to impossible to locate. The operator of the vehicle often wastes time driving around the area looking for an open space, or abandons the search, paying a large fee to park in a garage, or to use a valet parking space. It would be advantageous to be able to direct the operator of a vehicle to parking spaces (street side, parking garage, etc.) that are currently available in a specified geographic area.

BRIEF DESCRIPTION OF THE INVENTION

According to one aspect of the invention, a method is provided for identifying available parking spaces. The method includes receiving data about a parking space from a vehicle, the data including a geographic indicator associated with the parking space. The data is stored in a database of available parking spaces. A geographic location is received from a parking space requestor. The database is searched for an available parking space within a proximity of the geographic location. If an available parking space within a proximity of the geographic location is located in the database, a geographic indicator associated with the available parking space is transmitted to the parking space requestor.

In another aspect of the invention, a method is provided for determining rules associated with a parking space. The method includes receiving a geographic location from a requester. Mapping software is utilized to determine a parking rule associated with the geographic location. The parking rule is then transmitted to the requestor.

In another aspect of the invention, a system for identifying available parking spaces is provided. The system includes a storage medium for storing a database of available parking spaces. The system also includes a control unit in communication with the storage medium and including instructions for facilitating receiving data about a parking space from a vehicle, the data including a geographic indicator associated with the parking space. The data is stored in the database. A geographic location is received from a parking space requester. The database is searched for an available parking space within a proximity of the geographic location. If an available parking space within a proximity of the geographic location is located in the database, a geographic indicator associated with the available parking space is transmitted to the parking space requester.

In a further aspect of the invention, a computer program product is provided for identifying available parking spaces. The computer program product includes a storage medium readable by a processing circuit and storing instructions for execution by the processing circuit for performing a method. The method includes receiving data about a parking space from a vehicle, the data including a geographic indicator associated with the parking space. The data is stored in a database of available parking spaces. A geographic location is received from a parking space requester. The database is searched for an available parking space within a proximity of the geographic location. If an available parking space within a proximity of the geographic location is located in the database, a geographic indicator associated with the available parking space is transmitted to the parking space requester.

BRIEF DESCRIPTION OF THE DRAWINGS

Referring now to the figures, which are meant to be exemplary embodiments, and wherein the like elements are numbered alike.

DETAILED DESCRIPTION OF THE INVENTION

Exemplary embodiments of the present invention assist a vehicle operator in locating a parking space using vehicle, global positioning system (GPS), telematics and map-based information to identify and provide directions to nearby available parking spaces. Information utilized to determine the existence of an available nearby parking space is of a variety of types obtainable through a variety of means. In exemplary embodiments of the present invention, the combination of side pointing sensors (e.g., near and mid-range radar, ultrasonics and infrared) plus GPS devices on moving vehicles are utilized to identify areas where there are no cars (or gaps in the cars) parked along city streets. This information may be shared directly between vehicles through vehicle telematics, or alternatively, uploaded to a centrally maintained database. "Empty" (or "available") spaces so identified are compared to electronic maps to identify the subset of those spaces that are legal parking spaces. Alternatively, satellite based vision systems are utilized to locate empty spaces which are then compared to map information to identify unoccupied legal parking spaces. Further embodiments include parking meters, or other traffic devices, that are equipped with ultrasonic, infrared, etc. sensors that are utilized to identify whether a parking space is empty and then to transmit a signal indicating the availability of the parking space to vehicles within the vicinity or to a central database, located for example on a host system.

In alternate exemplary embodiments of the present invention, the operator of a vehicle that is legally parked broadcasts the imminent availability of his parking space to other vehicles in the area or, alternatively, posts the imminent availability of his parking space on a web site "billboard." The operator of the vehicle leaving the parking space may offer the parking space to the highest bidder (e.g., in terms of parking space credits). Once "sold" an electronic message is exchanged when the purchaser is ready to take possession of the parking space, and parking space credits are transferred from the buyer to the seller upon successful completion of the parking space exchange.

In further alternate exemplary embodiments of the present invention, parking lot owners subscribe to the central database where, for a fee, they can post the number of parking spaces that are presently available in their parking lot. The central database is accessed, again possibly for a fee, by vehicle operators seeking parking spaces proximate to specified destinations. The operator of a vehicle seeking a parking space may reserve one of the open parking spaces in the parking lot (starting immediately or at a specified time in the future).

Figure 1:
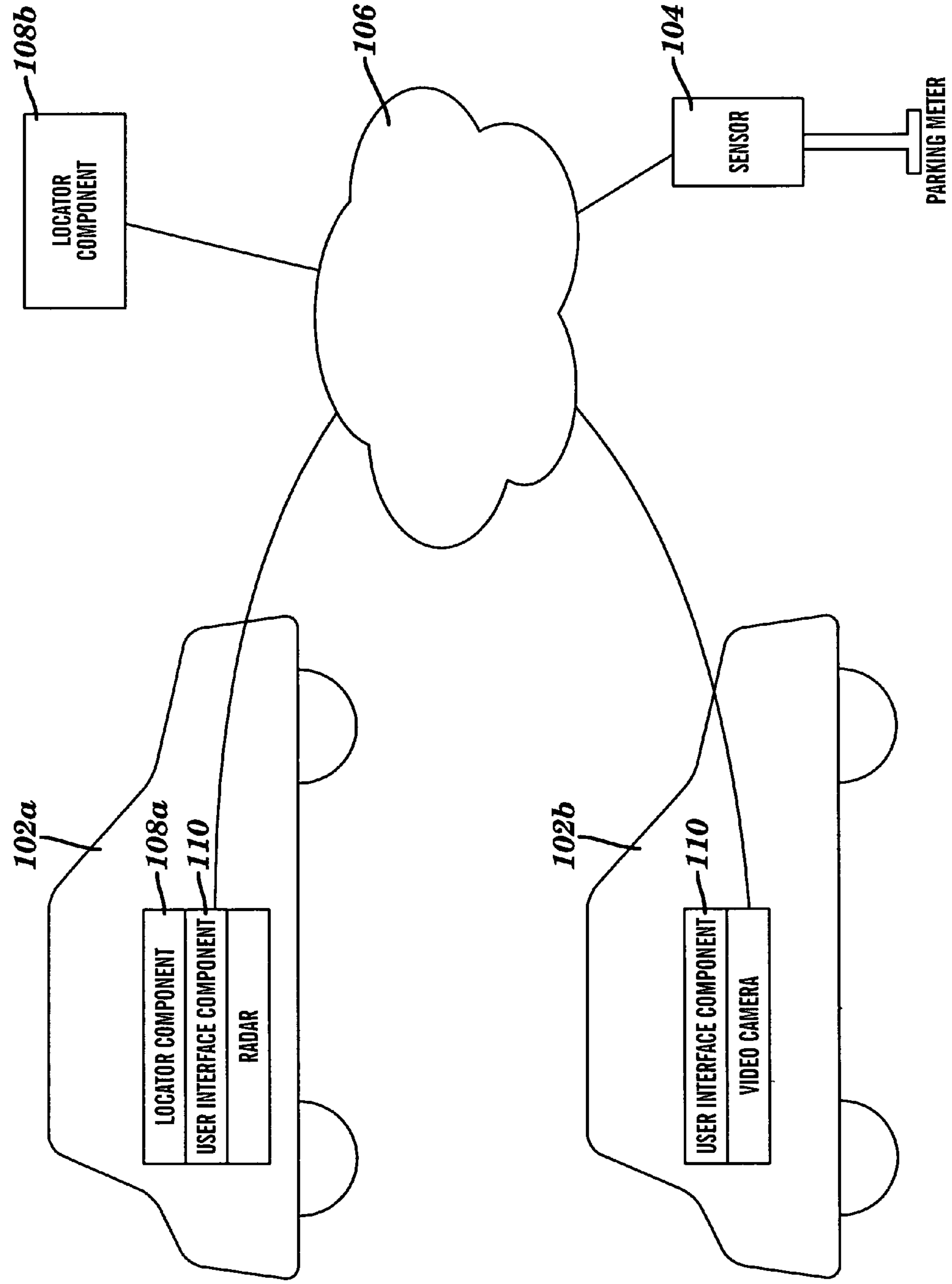
FIG. 1 is a block diagram of a parking space locator system that may be implemented by exemplary embodiments of the present invention.

FIG. 1 is a block diagram of a parking space locator system that may be implemented by exemplary embodiments of the present invention. The parking space locator system includes a network 106 and one or more vehicles 102 in communication with the network 106. In exemplary embodiments of the present invention, the network 106 includes any wireless network known in the art (e.g., a wireless-fidelity (Wi-Fi) network and a short range wireless network) for facilitating the communication between the vehicles 102 and the locator component 108. Vehicle telematics (e.g., a wireless Ethernet card), as known in the art, are provided in the vehicles 102 to provide communication with the network 106. When exemplary embodiments of the present invention include vehicles communicating directly with each other to locate parking spaces, the wireless network may be any suitable short to mid range wireless network for communication between the vehicles 102. The exemplary embodiment of the present invention depicted in FIG. 1 includes a centrally located locator component 108*b* for tracking currently available parking spaces within a specified geographic area. The specified geographic area may comprise a country, a state, a city or town, or a portion of a city or town. The data stored that specifies the currently available parking spaces could be stored in multiple storage devices and accessed individually or stored and accessed as a single consolidated database of available parking spaces in a host system. The available parking spaces may be stored in any type of storage device and in any convenient format (e.g., relational database, sequential file and persistent object). The storage of available parking spaces is referred to herein as the database of available parking spaces for convenience, it is not meant to imply that the only manner of storing the available parking spaces is in a database. The locator component 108 is described in more detail in reference to FIG. 2 below.

The exemplary embodiment depicted in FIG. 1 also includes a vehicle 102*a* with a locator component 108*a* for matching up requests for parking spaces with available parking spaces, a user interface component 110 for requesting and receiving notice of available parking spaces and a radar sensor for use in identifying possible parking spaces. The locator component 108*a* located on the vehicle 102*a* may include available parking spaces within a local area that have been communicated directly to the vehicle 102*a* by other vehicles in the local area. The vehicle 102*a* may also include maps from mapping software that correspond to the local area. The vehicle 102*a* may then access the centrally locator component 108*b* via the network 106 to identify available parking spaces and maps for other geographic areas. The vehicle 102*a* accesses the network 106 via vehicle telematics located within the vehicle 102*a*. The vehicle 102*a* also includes radar (e.g., near or far) for detecting possible available parking spaces. The vehicle 102*a* may compare the GPS coordinate data from gaps identified by the radar with valid parking spaces using the locator component 108*a* on the vehicle 102*a* and/or the vehicle 102*a* may transmit the GPS coordinate data to the centrally located locator component 108*b* via the network 106.

Two or more vehicles 102 equipped with both the locator component 108*a* and the user interface component 110 may communicate directly with each other using vehicle telematics and a WiFi or other wireless network (e.g., a short range network). This may be useful when the vehicles 102 are generally operated in close geographic proximity to each other. The locator component 108*a* on the vehicles may include a subset of the functionality of the central locator component 108*b*. For example, the locator component 108*a* may include a smaller database of available parking spaces 204 covering a subset of the geographic locations covered by the central locator component 108*b*.

Also depicted in FIG. 1 is a vehicle 102*b* with an on-board user interface component 110 for interfacing with the locator component 108*b* via the network 106. The user interface component 110 communicates with the locator component 108*b* and provides an interface to several functions including requesting available parking spaces, notifying the locator component 108*b* of possible available parking spaces, presenting the available parking spaces to the operator (or to one of the passengers) of the vehicle 102*b* and notifying the locator component 108*b* that the vehicle 102*b* has parked in one of the available parking spaces. The user interface component 110 is described in more detail below. The vehicle 102*b* also includes a video camera for providing information about possible available parking spaces to the centrally located locator component 108*b* and/or to the locator component 108*a* on the other vehicle 102*a*. As described previously, the video camera may already be located in the vehicle 102 and utilized for driver assistance functions such as parking assistance. The same video camera data may be utilized by the locator component 108*b* to identify the absence of vehicles 102, or gaps, in parking spaces.

FIG. 1 also depicts a parking meter 104 with a sensor for determining if a vehicle is in the parking space associated with the parking meter 104. This sensor information is also sent to the centrally located locator component 108*b* and/or to the locator component 108*a* on the vehicle 102*a*. The sensor information, which includes the GPS coordinates (or other unique geographic location designation) is compared to known parking space locations as designated by the electronic maps. The GPS coordinates are added to the available parking spaces if they correspond to a valid parking space.

Figure 2:
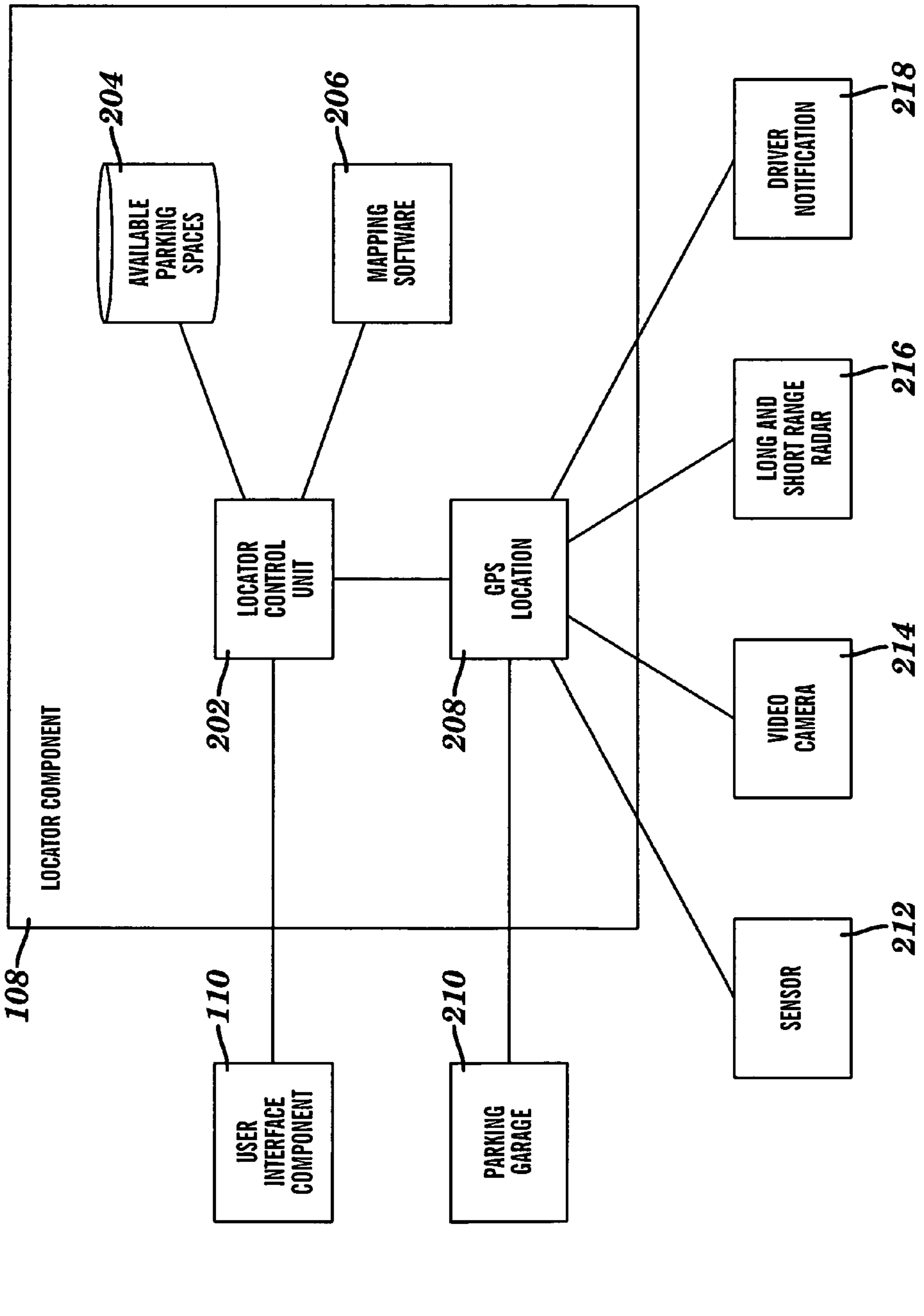
FIG. 2 is a block diagram of a system for providing a locator component of a parking space locator system that that may be utilized by exemplary embodiments of the present invention.

FIG. 2 is a block diagram of an exemplary embodiment of a system for providing the locator component 108 of the parking space locator system. As depicted in FIG. 2, the locator component 108 includes a locator control unit 202 with computer instructions for matching up requests for parking spaces with available parking spaces. The locator control unit 202 communicates with a database of available parking spaces 204. In addition, the locator control unit 202 communicates with mapping software 206 to compare GPS locations 208 (e.g., GPS coordinates) to valid parking locations. Further, the locator control unit 202 is in communication with one or more user interface components 110 in vehicles 102.

As indicated in FIG. 2, GPS locations 208 corresponding to possible parking spaces may be received from a variety of sources including, but not limited to sensors 212, video cameras 214 and radar systems 216 located on vehicles 102 and/or on stationary objects such as parking meters or parking garage structures. Any sources of information about possible parking spaces may be utilized by exemplary embodiments of the present invention. Systems utilized for parking assistance and driver assistance (e.g., radar, video cameras) are also utilized by exemplary embodiments of the present invention to identify where there are no vehicles, or gaps in vehicles parked along city streets. The GPS locations associated with the gaps are then compared to legal parking spaces using mapping software to identify the gaps that correspond to legal parking spaces. The more sources of information utilized to identify potential parking spaces, the better the estimation of the available parking spaces.

In addition, the GPS locations 208 may be received from a system or operator of a parking garage 210 to indicate the availability of parking spaces in the parking garage or parking lot. Further, GPS locations 208 may be received as part of a driver notification 218. Driver notification includes having the operator (or passenger) of the vehicle sending the GPS indicator of the parking space that the vehicle is currently vacating to the locator component 108, thus indicating that the parking space is currently available or will be available shortly. Alternatively, or in addition, the vehicle 102 may automatically send a notification to the locator component 108 when the vehicle 102 has been stopped in a valid parking space for a specified amount of time and is now being started or is moving. This is an indication that the parking space is now available. The driver notification 218 and the other sources of GPS locations 208 are also utilized to delete, or remove, a parking space from the database of available parking spaces 204.

The database of available parking spaces 204 may store (or retrieve from the mapping software) additional information about the characteristics, or parking rules, of one or more of the available parking spaces. The parking rules may include, but are not limited to types of coins accepted by the parking meter, hourly or daily price and/or hours of operation if in a parking garage, handicapped or other type of restriction on the parking space, maximum amount of time allowed, etc. In this manner, the requestor of the parking space can make a more informed decision about where to park. For example, a vehicle operator could request the identification of any nearby available handicapped parking spaces or for parking meters that allow for more than two hours of parking or for the least expensive parking garage within a particular distance from the current location.

All or portions of the locator component 108 (e.g., the locator control unit 202, the mapping software 206 and the database of available parking spaces 204) may be integrated and shared with other vehicle functions (e.g., providing directions to a location). In addition, all or portions of the locator component 108 may be located on the vehicle 102 or remote to the vehicle 102. The mapping software 206 may be implemented by any commercial software package, including, but not limited to: TomTom Go Portable Navigation, Garmin StreetPilot 2620 GPS Portable Car Navigation, and Kenwood DNA-DV4100/DDX-7012 DVD/GPS Navigation Package.

Figure 3:
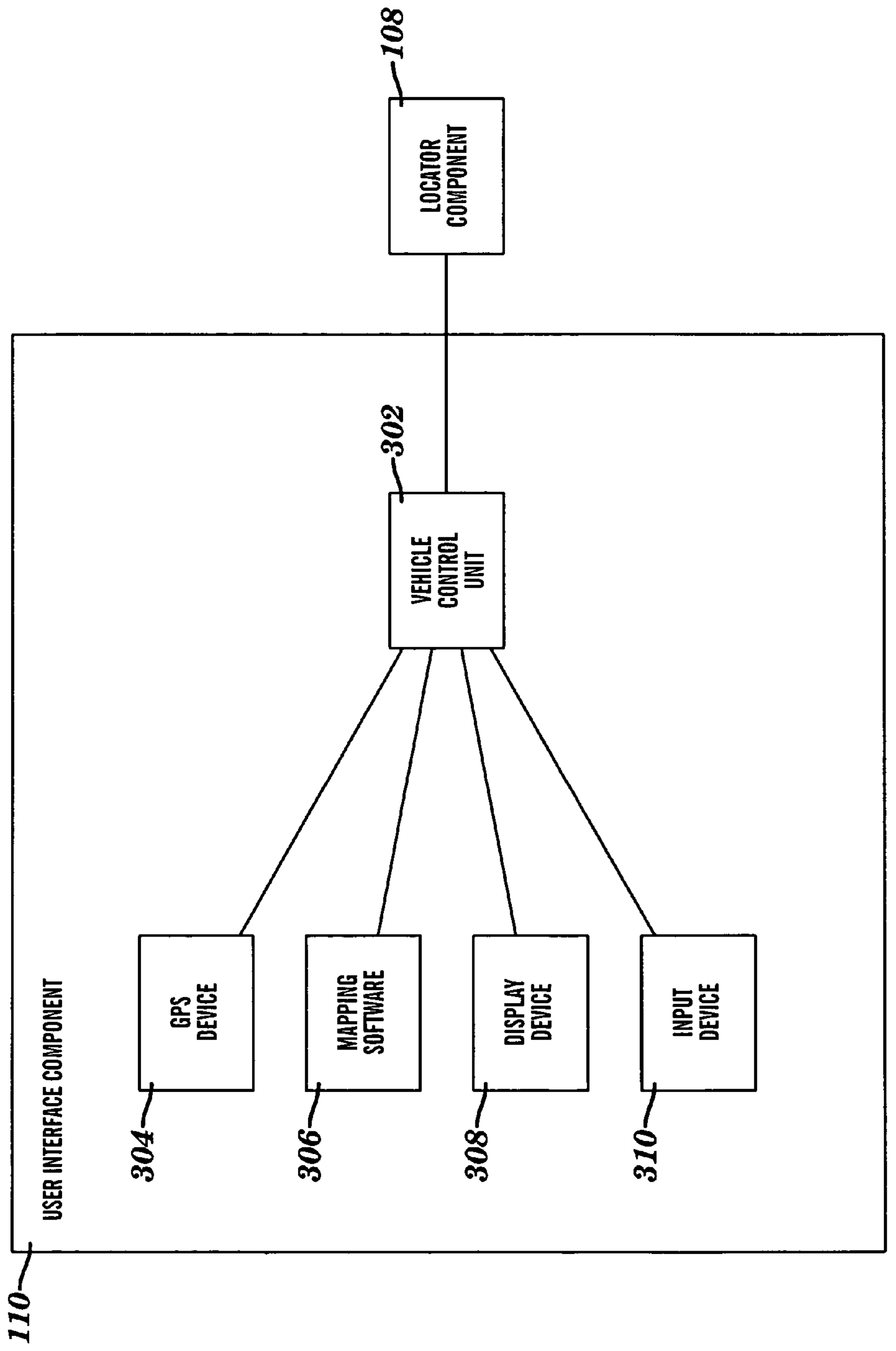
FIG. 3 is a block diagram of a system for providing a user interface component of a parking space locator system, that that may be utilized by exemplary embodiments of the present invention.

FIG. 3 is a block diagram of an exemplary embodiment of a system located in a vehicle 102 for providing the user interface component 110 of the parking space locator system. The user interface component 110 includes a vehicle control unit 302 that is in communication (e.g., via a wireless network, directly connected, etc.) with a GPS device 304, mapping software 306, a display device 308, an input device 310 and the locator component 108 described previously. The GPS device 304 is utilized to determine the GPS coordinates of the vehicle. The mapping software 306 is utilized to display and/or to describe directions to the vehicle operator to the currently available parking spaces. In an exemplary embodiment, the display device 308 shows a graphic display of a map with locations of available parking spaces flashing so that the vehicle operator can identify where the available parking spaces are located. In another exemplary embodiment, the mapping software 306 provides verbal and/or displayed directions to a selected available parking space. In an alternate exemplary embodiment, the user interface component 110 does not contain the mapping software 306 and instead the portions of the map including available parking spaces are downloaded from the locator component 108.

The display device 308 may be shared with other functions provided by the vehicle 102 or it may be dedicated to the parking space locating functions. All or portions of the user interface component 110 (e.g., the vehicle control unit 302, the GPS device 304, the mapping software 306, the display device 308 and the input device 310) may be integrated and shared with other vehicle functions (e.g., providing directions to a location). Any sensors 212, video cameras 214 and radar system 216 located on the vehicle may be shared with other functions (e.g., collision detection and warning systems and lane departure warning systems). Any information collected by a vehicle 102 or other traffic device (e.g., parking meter, traffic light) that could be helpful to locating an available parking space may be utilized by exemplary embodiments of the present invention.

The input device 310 is utilized by the operator (or a passenger) of the vehicle 102 to perform functions such as requesting a parking space, reporting that the vehicle 102 is about to exit a parking space and/or reporting that the vehicle has parked and that the available parking space is no longer available. The input device 310 may be implemented in any manner for receiving information including, but not limited to, voice, touch screen and keyboard. Similarly, the display device 308 may be implemented in any manner for presenting information including, but not limited to, voice, text and graphics.

Figure 4:
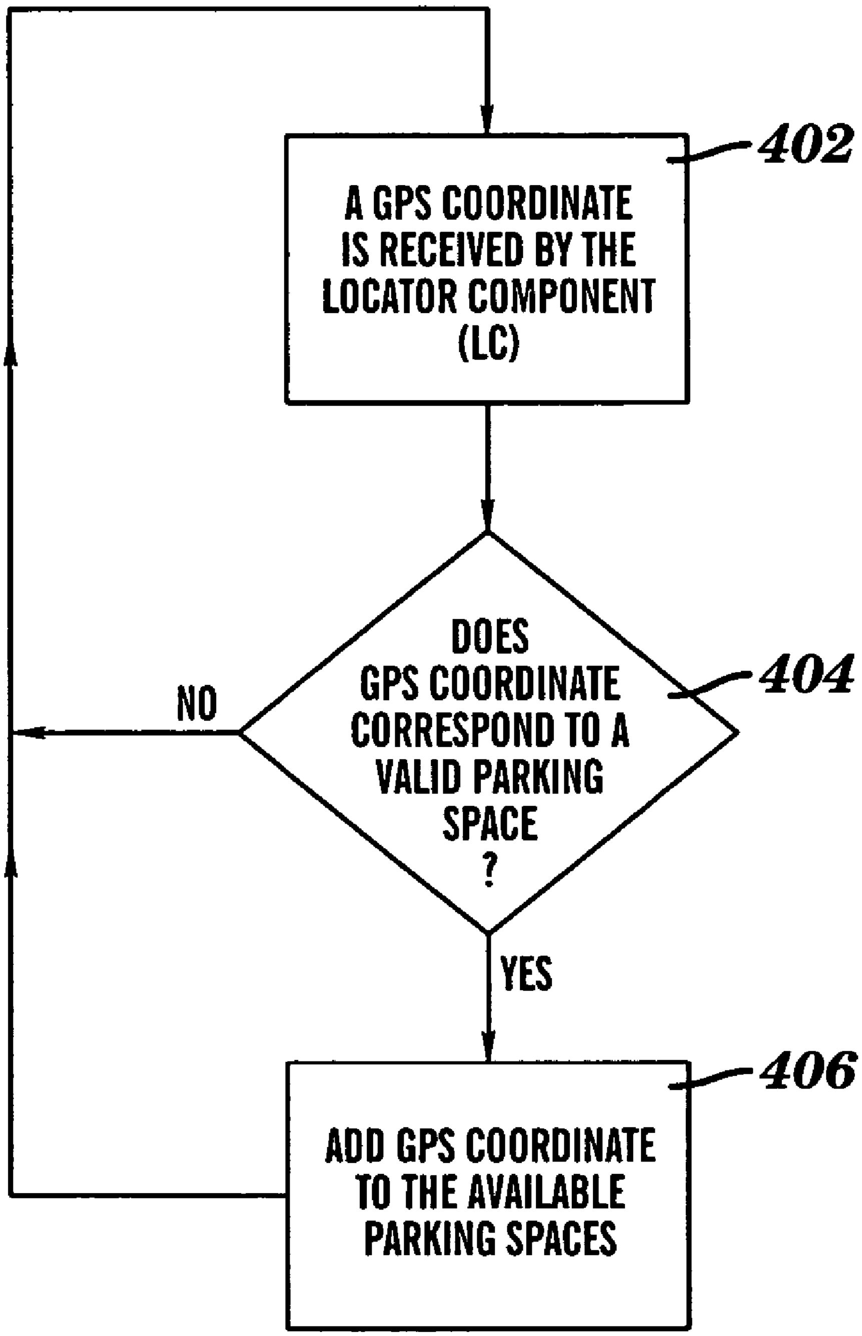
FIG. 4 is a process flow that may be utilized by exemplary embodiments of the present invention to populate a database of potentially available parking spaces.

FIG. 4 is a process flow that may be utilized by exemplary embodiments of the present invention to populate the database of available parking spaces 204. In exemplary embodiments of the present invention, instructions to perform the processing described in FIG. 4 are located in the locator component 108. At step 402, data about a parking space is received by the locator component 108. The data includes a geographic indicator (e.g., a GPS coordinate) associated with the parking space. As described previously, the geographic indicator may be received from any source for identifying a possible available parking space (or to indicate that an available parking space has been filled and is no longer available), including, but not limited to, a sensor 212 on a parking meter, a video camera 214 on a vehicle and a satellite based vision system 220. Also as described previously, GPS is used as an example of a geographic location system and the invention is not limited to the use of a GPS system and GPS coordinates, but could also be implemented using any system for identifying approximate geographic locations. The geographic indicators may be received on a nearly continuous basis from vehicles 102 and other traffic devices in order to keep the database of available parking spaces 204 as real time as possible. The more frequent the updates from the vehicles and traffic devices, the more accurate the data in the database of available parking spaces 204. In addition, the more sources of GPS locations 208, the more cross checking that can be performed which may lead to a more accurate assessment of available parking spaces.

At step 404, it is determined if the geographic indicator (e.g., a GPS coordinate) corresponds to a valid parking space. This is performed by matching the GPS coordinate to maps provided by the mapping software 206. The matching is performed within a specified margin of error because GPS coordinates are not always exact and their precision is dependent on the type of GPS device 304 being utilized. If the mapping software 206 indicates that the GPS coordinates do not correspond to a valid parking space, then the loop is continued at step 402 to receive more GPS coordinates.

If the mapping software 206 indicates that the GPS coordinates correspond to a valid parking space, then the GPS coordinates are added to the database of available parking spaces 204 at step 406. As described previously, other information about the parking space (e.g., handicapped status) may be stored along with the GPS coordinates. Alternatively, instead of storing the additional information, the additional information about the parking space may be obtained from mapping software 206 when requested.

Figure 5:
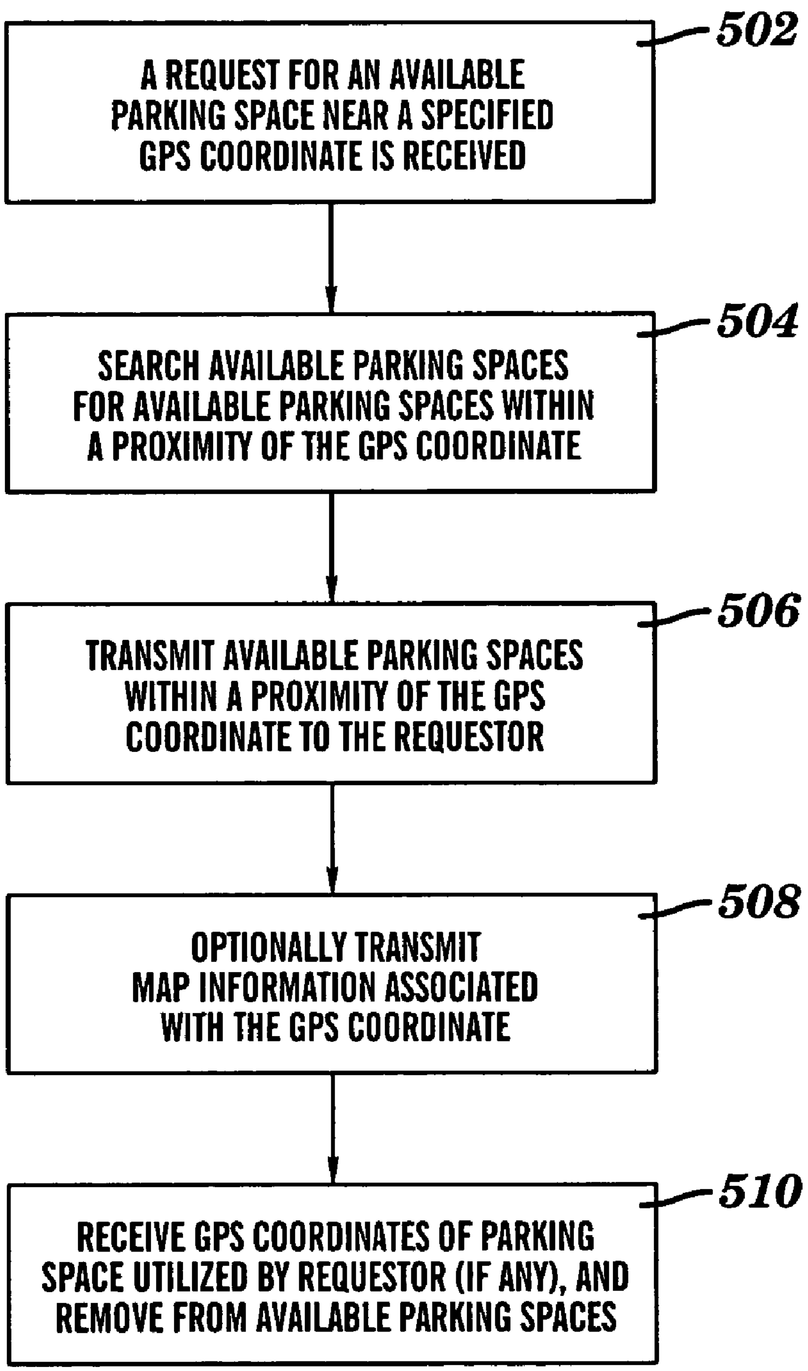
FIG. 5 is a process flow that may be utilized by exemplary embodiments of the present invention to locate a parking space.

FIG. 5 is a process flow that may be utilized by exemplary embodiments of the locator component 108 of the present invention to locate a parking space. At step 502, a request for an available parking space near a specified geographic location (e.g., a GPS coordinate) is received from a parking space requestor (e.g., an occupant of a vehicle 102). The GPS coordinate could be determined based on the requestor specifying a specific location (e.g., a sports arena) or by the requestor's current location. A requested maximum distance, or proximity, from the GPS coordinate may be system defined, user defined and/or able to be overwritten by the requestor on a request-by-request basis. At step 504, the locator component 108 searches the database of available parking spaces 204 for available parking spaces that are closest to the GPS coordinate and within the specified maximum distance, or proximity. If no available parking spaces are located within the specified proximity then the closest available parking spaces may be located by the locator component 108.

At step 506, the geographic indicators associated with the located available parking spaces, along with any additional characteristic information (handicapped status, coins accepted, etc.) is transmitted to the parking space requestor. Optionally, step 508 is performed to transmit maps and map information associated with the transmitted available parking space GPS coordinates to the requestor. This would typically be performed if requested by the requester and when the requestor does not have the maps corresponding to the GPS coordinates of the available parking spaces being provided by the locator component 108. At step 510, the locator component 108 receives the GPS coordinates of the parking space utilized by the requester, if any. The locator component 108 then removes the parking space associated with the GPS coordinates from the database of available parking spaces 204. This notification can be initiated by the requestor or can be automatically transmitted by the user interface component 110 in the vehicle 102 in response to the vehicle 102 being located in the parking space. Similarly, a notification that a parking space is available may be automatically transmitted by the user interface component 110 in the vehicle 102 in response to the vehicle 102 exiting the parking space.

Parking spaces as described herein include both parking spaces with signage and parking spaces without signage as well as other types of parking spaces including but not limited to metered parking spaces and parking spaces in parking garages. Exemplary embodiments of the present invention use mapping software 206 to provide the parking rules, or laws, associated with the parking space to the parking space requester. The parking rules include information about the parking space such as the maximum number of hours that a vehicle may be parked in the parking space, the days and times when the parking space is valid, and if the parking space is a handicapped parking space, the consequences associated with parking illegally in the parking space (e.g., towing and cost of ticket). In exemplary embodiments of the present invention, the parking space requestor provides information about an intended length of stay and is only provided with available parking spaces with a maximum length of stay that is longer than the intended length of stay. In other embodiments, the parking space requestor is provided with all available parking spaces within the geographic proximity of the geographic location and the maximum length of stay, or other parking rules, are communicated to the parking space requestor. If the parking space is a metered spot, the parking space requestor may be presented with a parking rule that includes the types of coins accepted by the meter.

The parking rules, along with available parking spaces, may be presented to the requestor in a variety of manners, including on the dashboard of the vehicle 102, on a mapping software 206 display, via a cellular telephone, via a personal digital assistant (PDA) and/or via a personal computer. The information may be presented as voice and/or text and/or graphics. The information may also be ordered in any manner desired by the requestor including closest parking space, cheapest parking space, etc.

In an alternate exemplary embodiment of the present invention, the operator of a vehicle 102 is warned of current or impending parking violations. The rules of the parking space may be communicated to the requestor when the vehicle 102 containing the requestor pulls in to a parking space or when the vehicle 102 has parked in the parking space (e.g., the engine has been turned off). A notice of impending violation (e.g., the time on your meter is above to run out, it is time to move your car to the other side of the road, etc) may be transmitted in any fashion (e.g., voice and text) to any user device including, but not limited to a cellular telephone, a beeper, a personal computer, a PDA, a map based software display and a display in a vehicle 102.

In an alternate exemplary embodiment of the present invention, only the navigation system is utilized by the vehicle 102. The navigation system on the vehicle 102 transmits the geographic location to mapping software 206. The mapping software 206 determines the parking rule(s) associated with the parking space. The parking rule(s) is then transmitted to the requestor (e.g, the operator of the vehicle 102 in the parking space). The parking rule(s) may relate to a geographic locale (e.g., town, city, street) and/or it may relate to the specific parking space. In addition, the requestor may specify a geographic locale with the system responding by providing suggested parking locations (e.g., by the river, to the west of the highway, and in a particular parking garage) in the geographic locale to the requestor. In this manner, a vehicle operator may easily find parking in a location that is not familiar to the operator.

In exemplary embodiments of the present invention, the vehicle 102 contains only a navigation system for providing a geographic indicator or location to a centralized service that provides all or portions of the rest of the functionality described herein. In other words, the vehicle 102 contains the user interface component 110 and a mobile service provides the locator component 108. A vehicle operator may subscribe to a mobile service, such as Onstar®, to provide the information about available parking spaces and/or the rules associated with parking spaces (i.e., the functionality provided by the locator component 108).

Figure 6:
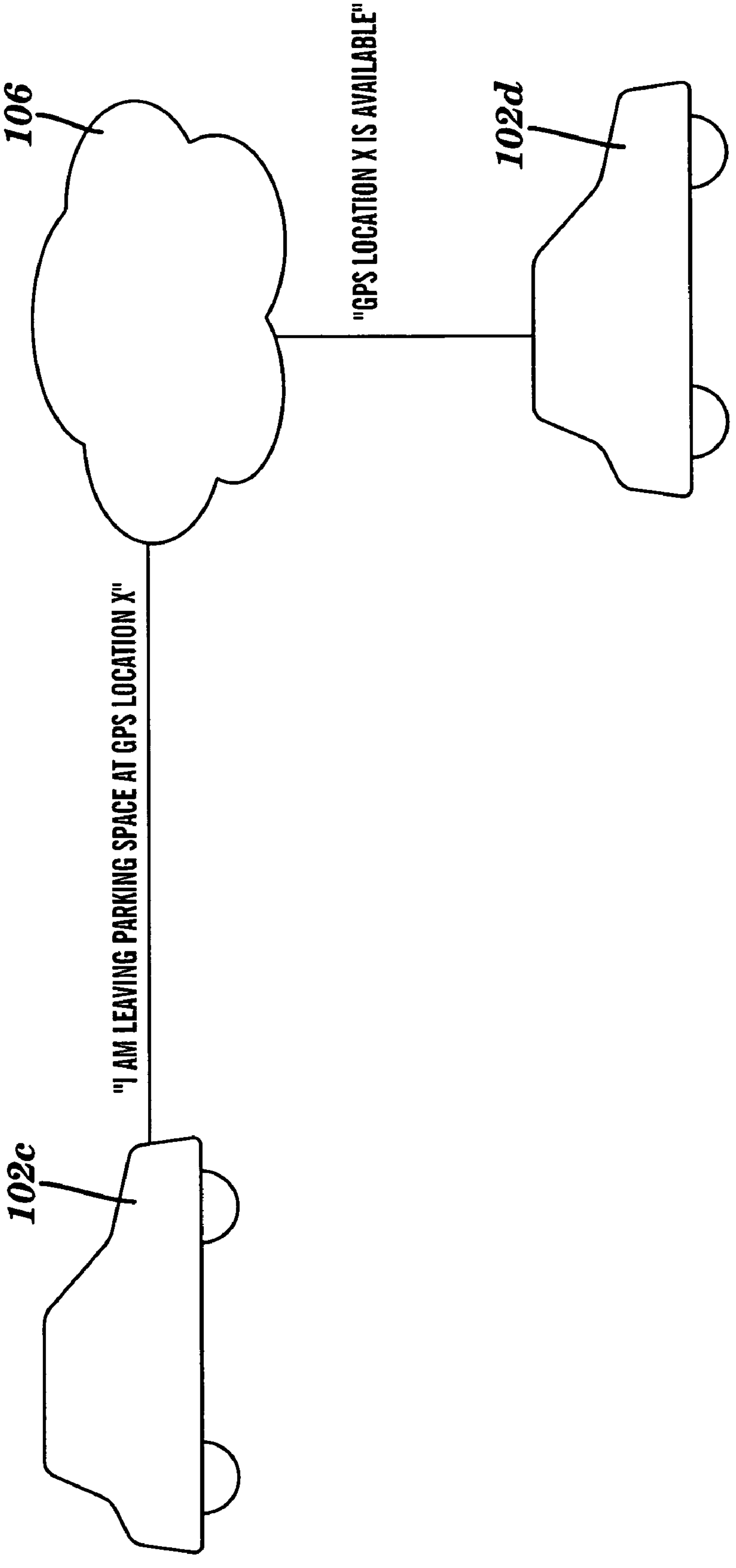
FIG. 6 is a block diagram of a parking space locator system that may be implemented by exemplary embodiments of the present invention.

FIG. 6 is a block diagram of a parking space locator system that may be implemented by exemplary embodiments of the present invention. As depicted in FIG. 6, one vehicle 102*c* is leaving a parking space and is transmitting a message via the network 106 (e.g., WiFi and short range vehicle network) to alert other vehicles 102 in the area that the vehicle 102*c* is about to leave a parking space located at a particular GPS coordinate. This message from the vehicle 102*c* may be posted on a website and/or transmitted locally to other vehicles 102*d*. Other vehicles 102 may bid on the soon to be available parking space, with the parking space going to the highest bidder. In exemplary embodiments of the present invention, the bidding is based on parking space credits to be transferred between the two vehicles. In this case, the vehicles 102 may have a subset of the parking space locator system including a network connection, and portions of the user interface component 110. In exemplary embodiments of the present invention, the bidding is performed by utilizing commercial software such as EBay.

Figure 7:
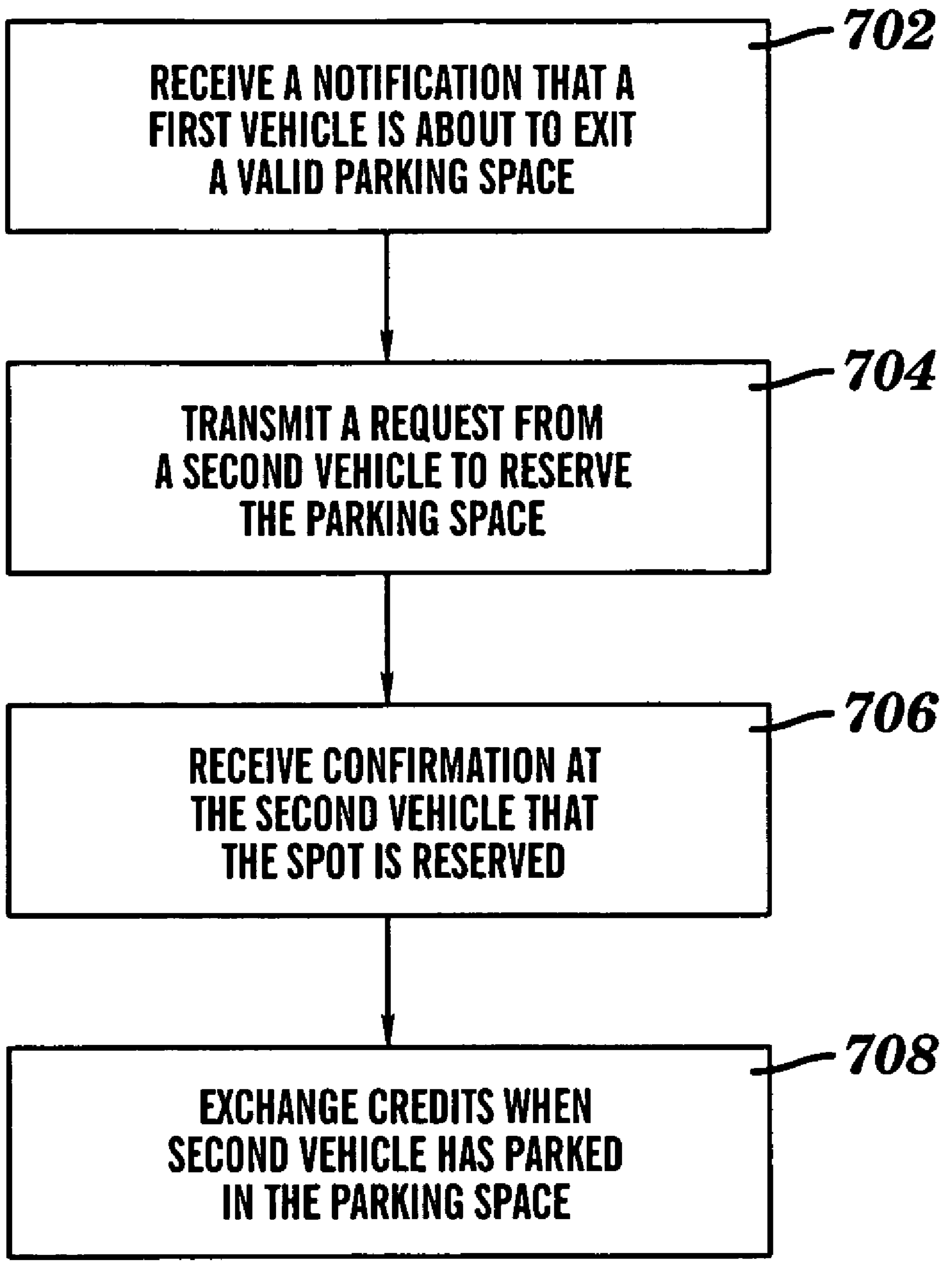
FIG. 7 is a process flow that may be utilized by exemplary embodiments of the present invention for parking space reservation between two vehicles.

FIG. 7 is a process flow that may be utilized by exemplary embodiments of the present invention for parking space reservation between two vehicles 102. At step 702, a notification that a first vehicle 102*c* is about to exit a valid parking space is received at a second vehicle 102*d*. At step 704, the second vehicle 102*d* transmits a request to the first vehicle 102*c* to reserve the parking space. This step may involve some negotiation between the first vehicle 102*c* and the second vehicle 102*d* about the number of credits to be exchanged, and the first vehicle 102*c* may be negotiating with more than one other vehicle 102. In an alternate exemplary embodiment of the present invention, the notification that the first vehicle 102*c* is about to exit a parking space is transmitted to a locator component 108 and the locator component 108 performs the negotiation and communication with other vehicles 102. At step 706, the second vehicle 102*d* receives confirmation that the parking space has been reserved. At step 708, the credits are exchanged when the second vehicle 102 enters the parking space.

Exemplary embodiments of the present invention include advertising for available parking spaces. An operator of a vehicle 102 about to leave a parking space may advertise the availability of the parking space via the network 106 or other transmission means that is received by vehicles 102 geographically proximate vehicles or planning to be geographically proximate to the parking space. An operator of a vehicle 102 looking for an available parking space may advertise for a parking space proximate to a geographic location. The operator of the vehicle 102 may reserve a parking space based on being the highest bidder when compared to other vehicles interested in the same parking space.

Exemplary embodiments of the present invention are utilized to identify available parking spaces and may lead to a decrease in the amount of time that an operator of a vehicle spends seeking out an available parking space. In addition, parking spaces may be reserved, thereby providing a high degree of certainty that a particular parking space will be available.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for identifying available parking spaces, the method comprising:

receiving data about a parking space from a first vehicle, the data including a geographic indicator associated with the parking space;

storing the data in a database of available parking spaces;

receiving a geographic location from a parking space requestor of a second vehicle;

searching the database for an available parking space within a proximity of the geographic location; and if an available parking space within a proximity of the geographic location is located in the database, determining a parking rule associated with the available parking space and transmitting a geographic indicator associated with the available parking space and the parking rule to the parking space requestor.

2. The method of claim 1 wherein the storing includes using mapping software to verify that the parking space is a valid parking space and storing the data in the database if the parking space is a valid parking space.

3. The method of claim 1 wherein the parking space is a parking space without signage.

4. The method of claim 1 wherein the parking space is a parking space with signage.

5. The method of claim 1 further comprising using mapping software and the geographic indicator associated with the available parking space to determine the parking rule associated with the available parking space.

6. The method of claim 5 further comprising communicating a possible current violation or imminent violation of the parking rule to the parking space requestor.

7. The method of claim 1 further comprising receiving information about a planned length of stay from the parking space requestor; and using mapping software and the geographic indicator associated with the available parking space to determine a maximum length of stay for the available parking space, wherein the transmitting is performed if the maximum length of stay is greater than the planned length of stay.

8. The method of claim 1 further comprising transmitting maps associated with the available parking space to the requestor.

9. The method of claim 1 wherein the data is received from one or more of a vehicle occupant, a sensor, a radar and a camera located on the vehicle.

10. The method of claim 1 wherein the data is also received from one or more of a sensor and a camera located on a traffic device.

11. The method of claim 1 wherein the data is also received from one or more of a parking garage system and a satellite based visioning system.

12. The method of claim 1 wherein the data is received automatically in response to a vehicle exiting or entering a parking space.

13. The method of claim 1 wherein one or more of the parking spaces in the database are included in an advertisement.

14. The method of claim 1 further comprising reserving the available parking space for the requestor.

15. The method of claim 1 wherein one or more of the parking spaces in the database are predicted to be available in the future and the method further comprises facilitating a bidding process for the parking spaces that will be available in the future.

16. The method of claim 1 wherein the parking space requestor is charged a fee for the locating the available parking space.

17. The method of claim 1 wherein the vehicle is provided a credit for the data about a parking space.

18. A method for determining rules associated with a parking space, the method comprising:

receiving a geographic location from a requestor vehicle;

using mapping software to determine a parking rule associated with the geographic location; and transmitting the parking rule to the requestor vehicle.

19. The method of claim 18 wherein the parking rule relates to a geographic locale.

20. The method of claim 18 wherein the geographic location is a geographic locale and the parking rule includes suggested parking locations in the geographic locale.

21. The method of claim 18 wherein the parking rule relates to a parking space.

22. The method of claim 18 further comprising communicating a possible current violation or imminent violation of the parking rule to the parking space requestor.

23. A system for identifying available parking spaces, the system comprising:

a storage medium for storing a database of available parking spaces; and a control unit in communication with the storage medium and including instructions for facilitating:

receiving data about a parking space from a first vehicle, the data including a geographic indicator associated with the parking space;

storing the data in the database;

receiving a geographic location from a parking space requestor of a second vehicle;

searching the database for an available parking space within a proximity of the geographic location; and if an available parking space within a proximity of the geographic location is located in the database, determining a parking rule associated with the available parking space and transmitting a geographic indicator associated with the available parking space and the parking rule to the parking space requestor.

24. The system of claim 23 wherein the storage medium and the control unit are located on the second vehicle and the parking space requestor is an occupant of the second vehicle.

25. The system of claim 23 further comprising a network in communication with the control unit, wherein the geographic location is received via the network and the geographic identifier is transmitted via the network.

26. The system of claim 25 wherein the network is a wireless fidelity network.

27. A computer program product for identifying available parking spaces, the computer program product comprising:

a storage medium readable by a processing circuit and storing instructions for execution by the processing circuit for performing a method, the method including:

receiving data about a parking space from a first vehicle, the data including a geographic indicator associated with the parking space;

storing the data in a database of available parking spaces;

receiving a geographic location from a parking space requestor of a second vehicle;

searching the database for an available parking space within a proximity of the geographic location; and if an available parking space within a proximity of the geographic location is located in the database, determining a parking rule associated with the parking space and transmitting a geographic indicator associated with the available parking space and the parking rule to the parking space requestor.

* * * * *